United States Patent
Park et al.

(10) Patent No.: US 9,070,022 B2
(45) Date of Patent: Jun. 30, 2015

(54) ROUTE CHANGE DETERMINATION SYSTEM AND METHOD USING IMAGE RECOGNITION INFORMATION

(75) Inventors: Kwang Il Park, Seoul (KR); Sang Mook Lim, Seoul (KR); Jin Hyuck Kim, Seoul (KR)

(73) Assignee: PLK TECHNOLOGIES CO., LTD., Seoul (KR)

( * ) Notice: Subject to any disclaimer, the term of this patent is extended or adjusted under 35 U.S.C. 154(b) by 169 days.

(21) Appl. No.: 13/984,695

(22) PCT Filed: Sep. 6, 2012

(86) PCT No.: PCT/KR2012/007169
§ 371 (c)(1),
(2), (4) Date: Aug. 9, 2013

(87) PCT Pub. No.: WO2014/027714
PCT Pub. Date: Feb. 20, 2014

(65) Prior Publication Data
US 2014/0050362 A1 Feb. 20, 2014

(30) Foreign Application Priority Data
Aug. 16, 2012 (KR) .................. 10-2012-0089592

(51) Int. Cl.
*G06K 9/00* (2006.01)
*G01C 21/30* (2006.01)

(52) U.S. Cl.
CPC ........ *G06K 9/00791* (2013.01); *G06K 9/00798* (2013.01); *G01C 21/30* (2013.01)

(58) Field of Classification Search
CPC combination set(s) only.
See application file for complete search history.

(56) References Cited

U.S. PATENT DOCUMENTS

| 7,216,023 B2 * | 5/2007 | Akita ............................... 701/41 |
| 7,664,599 B2 | 2/2010 | Yamamoto |
| 7,742,872 B2 | 6/2010 | Kimura et al. |
| 7,750,823 B2 * | 7/2010 | Kim et al. ...................... 340/902 |
| 7,990,286 B2 * | 8/2011 | Shankwitz et al. ........... 340/988 |

(Continued)

FOREIGN PATENT DOCUMENTS

| JP | 2005-265494 A | 9/2005 |
| JP | 2006-023278 A | 1/2006 |

(Continued)

*Primary Examiner* — Anand Bhatnagar
(74) *Attorney, Agent, or Firm* — Rabin & Berdo, P.C.

(57) ABSTRACT

Provided is a route change determination system and method using image recognition information, which is capable of extracting position information having high precision similar to that of a high-precision DGPS device, while using a low-precision GPS device, in order to determine a change of a traveling route.

The route change determination system using image recognition system includes: a GPS module; an image recognition module having a line recognition function; a road map storage module configured to store road map information and route change possible section information for changing a route of a vehicle; a road map receiving module configured to receive the road map information; and an information processing module configured to determine whether the route is changed or not, based on line recognition information acquired through the image recognition module and the route change possible section information.

19 Claims, 12 Drawing Sheets

(56) References Cited

U.S. PATENT DOCUMENTS

| | | | |
|---|---|---|---|
| 8,145,425 B2* | 3/2012 | Goto et al. | 701/416 |
| 8,315,756 B2* | 11/2012 | Caveney | 701/23 |
| 2004/0143381 A1* | 7/2004 | Regensburger et al. | 701/36 |
| 2006/0020389 A1 | 1/2006 | Yamamoto | |
| 2006/0031008 A1 | 2/2006 | Kimura et al. | |
| 2006/0233424 A1* | 10/2006 | Miyajima et al. | 382/104 |
| 2007/0124072 A1* | 5/2007 | Nakayama et al. | 701/211 |
| 2010/0094537 A1* | 4/2010 | Goto et al. | 701/201 |

FOREIGN PATENT DOCUMENTS

| | | |
|---|---|---|
| JP | 2006-047291 A | 2/2006 |
| JP | 2006-300534 A | 11/2006 |

* cited by examiner

| LINE CHARACTERISTIC INFORMATION | | FIRST LANE | | SECOND LANE | | THIRD LANE | | FOURTH LANE | | FIFTH LANE | |
|---|---|---|---|---|---|---|---|---|---|---|---|
| LINE NUMBER | | 0 | | 1 | | 2 | | 3 | | 4 | | 5 | |
| D O U B L E | L I N E | 1 | YELLOW | SOLID LINE | BLUE | SOLID LINE | WHITE | DOTTED LINE | WHITE | DOTTED LINE | WHITE | DOTTED LINE | WHITE | SOLID LINE |
| | | 2 | YELLOW | SOLID LINE | BLUE | SOLID LINE | | | | | | | | |
| | | 3 | – | – | – | – | – | – | – | – | – | – | – | – |

LINE RECOGNITION INFORMATION

| LINE NUMBER | | 0 | | 1 | |
|---|---|---|---|---|---|
| DOUBLE LINE | 1 | BLUE | SOLID LINE | WHITE | DOTTED LINE |
| | 2 | BLUE | SOLID LINE | – | – |
| | 3 | – | – | – | – |

FIG. 4

LINE RECOGNITION INFORMATION

| LINE NUMBER | | 0 | | 1 | |
|---|---|---|---|---|---|
| DOUBLE LINE | 1 | BLUE | SOLID LINE | WHITE | DOTTED LINE |
| | 2 | BLUE | SOLID LINE | – | – |
| | 3 | – | – | – | – |

Exact match · Exact match

LINE CHARACTERISTIC INFORMATION

| LINE NUMBER | | 0 | | 1 | | 2 | | 3 | | 4 | | 5 | |
|---|---|---|---|---|---|---|---|---|---|---|---|---|---|
| DOUBLE LINE | 1 | YELLOW | SOLID LINE | BLUE | SOLID LINE | WHITE | DOTTED LINE | WHITE | DOTTED LINE | WHITE | DOTTED LINE | WHITE | SOLID LINE |
| | 2 | YELLOW | SOLID LINE | BLUE | SOLID LINE | – | – | – | – | – | – | – | – |
| | 3 | – | – | – | – | – | – | – | – | – | – | – | – |

FIG. 5

LINE RECOGNITION
INFORMATION

| LINE NUMBER | | 0 | | 1 | |
|---|---|---|---|---|---|
| D O U B L E | L I N E 1 | BLUE | SOLID LINE | WHITE | DOTTED LINE |
| | 2 | – | – | – | – |
| | 3 | – | – | – | – |

Partial match — column 1
Exact match — column 2

LINE CHARACTERISTIC
INFORMATION

| LINE NUMBER | | 0 | | 1 | | 2 | | 3 | | 4 | | 5 | |
|---|---|---|---|---|---|---|---|---|---|---|---|---|---|
| D O U B L E | L I N E 1 | YELLOW | SOLID LINE | BLUE | SOLID LINE | WHITE | DOTTED LINE | WHITE | DOTTED LINE | WHITE | DOTTED LINE | WHITE | SOLID LINE |
| | 2 | YELLOW | SOLID LINE | BLUE | SOLID LINE | – | – | – | – | – | – | – | – |
| | 3 | – | – | – | – | – | – | – | – | – | – | – | – |

FIG. 6

LINE CHARACTERISTIC INFORMATION

| LINE NUMBER | 0 | | 1 | | 2 | | 3 | |
|---|---|---|---|---|---|---|---|---|
| DOUBLE LINE 1 | YELLOW | SOLID LINE | BLUE | SOLID LINE | WHITE | DOTTED LINE | WHITE | DOTTED LINE |
| DOUBLE LINE 2 | – | – | – | – | – | – | – | – |
| DOUBLE LINE 3 | – | – | – | – | – | – | – | – |

|  | Partial match | | Partial match | | Exact match | | Exact match | | | | | |

LINE CHARACTERISTIC INFORMATION

| LINE NUMBER | 0 | | 1 | | 2 | | 3 | | 4 | | 5 | |
|---|---|---|---|---|---|---|---|---|---|---|---|---|
| DOUBLE LINE 1 | YELLOW | SOLID LINE | BLUE | SOLID LINE | WHITE | DOTTED LINE | WHITE | DOTTED LINE | WHITE | DOTTED LINE | WHITE | SOLID LINE |
| DOUBLE LINE 2 | YELLOW | SOLID LINE | BLUE | SOLID LINE | – | – | – | – | – | – | – | – |
| DOUBLE LINE 3 | – | – | – | – | – | – | – | – | – | – | – | – |

FIG. 7

LINE RECOGNITION INFORMATION

| LINE NUMBER | 0 | | 1 | |
|---|---|---|---|---|
| DOUBLE LINE 1 | WHITE | DOTTED LINE | WHITE | DOTTED LINE |
| DOUBLE LINE 2 | – | – | – | – |
| DOUBLE LINE 3 | – | – | – | – |

| LINE NUMBER | 0 | | 1 | |
|---|---|---|---|---|
| DOUBLE LINE 1 | WHITE | DOTTED LINE | WHITE | DOTTED LINE |
| DOUBLE LINE 2 | – | – | – | – |
| DOUBLE LINE 3 | – | – | – | – |

LINE CHARACTERISTIC INFORMATION

| LINE NUMBER | 0 | | 1 | | 2 | | 3 | | 4 | | 5 | |
|---|---|---|---|---|---|---|---|---|---|---|---|---|
| DOUBLE LINE 1 | YELLOW | SOLID LINE | BLUE | SOLID LINE | WHITE | DOTTED LINE | WHITE | DOTTED LINE | WHITE | DOTTED LINE | WHITE | SOLID LINE |
| DOUBLE LINE 2 | YELLOW | SOLID LINE | BLUE | SOLID LINE | – | – | – | – | – | – | – | – |
| DOUBLE LINE 3 | – | – | – | – | – | – | – | – | – | – | – | – |

FIG. 8

| | | FIRST LANE | SECOND LANE | THIRD LANE | FOURTH LANE | FIFTH LANE | | | | |
|---|---|---|---|---|---|---|---|---|---|---|
| LINE NUMBER | | 0 | 1 | 2 | 3 | 4 | 5 | | | |
| WIDTH | | | 3.5m | 2.5m | 2.7m | 3.3m | 2.8m | | | |
| D O U B L E  L I N E | 1 | YELLOW SOLID LINE | BLUE SOLID LINE | WHITE DOTTED LINE | WHITE DOTTED LINE | WHITE DOTTED LINE | WHITE SOLID LINE | | | |
| | 2 | YELLOW SOLID LINE | BLUE SOLID LINE | – | – | – | – | | | |
| | 3 | – | – | – | – | – | – | | | |

ROUTE CHANGE DETERMINATION SYSTEM AND METHOD USING IMAGE RECOGNITION INFORMATION

STATEMENT REGARDING SPONSORED RESEARCH

This invention was made with Korean government support under Technology Innovation Projects (Grant No. 10110-13-1002) awarded by Ministry of Trade, Industry & Energy, Ministry of Science, ICT and Future Planning, and National IT Industry Promotion Agency. The Korean governments have certain rights in the invention.

TECHNICAL FIELD

The present invention relates to a supportive technique for safe driving, and more particularly, to a system and method for determining a route change of a vehicle using image recognition information.

BACKGROUND

Recently, much research has been conducted for safe driving of a vehicle driver. That is, an electronic device such as a navigation device guides a destination when a vehicle is operated or re-searches and guides a destination when the vehicle departs from a route to the destination, using global positioning system (GPS) position information and various sensors based on road map information.

However, conventional GPS devices have a positional deviation of 20 to 30 m. Thus, the conventional GPS devices cannot precisely recognize a traveling lane. Therefore, although a vehicle departs from a route to a destination, the conventional GPS devices cannot immediately guide the destination. When a driver selects a wrong route such that the vehicle departs from the route to the destination, the vehicle must return after traveling a considerably long distance or make a detour to another route.

A recently-developed differential GPS (DGPS) device has a positional deviation of about 1 m. Since general roads have a width of 3 to 5 m, line information recognized by the DGPS device may be used to guide a route departure.

However, the DGPS device is very expensive. Thus, when the DGPS device is mounted in a vehicle, the price of the vehicle rapidly increases. That is, there is a fundamental limit in mounting an autonomous navigation system using the DGPS device in a vehicle.

DISCLOSURE

Technical Problem

An embodiment of the present invention is directed to a route change determination system and method using image recognition information, which is capable of extracting position information having high precision similar to that of a high-precision DGPS device, while using a low-precision GPS device, in order to determine a change of a traveling route.

Another embodiment of the present invention is directed to a route change determination system and method using image recognition information, which is capable of determining a change of a traveling route using line information, image recognition information, and section information which are connected to a GPS device.

Technical Solution

According to an embodiment of the present invention, a route change determination system using image recognition system includes: a GPS module; an image recognition module having a line recognition function; a road map storage module configured to store road map information and route change possible section information for changing a route of a vehicle; a road map receiving module configured to receive the road map information; and an information processing module configured to determine whether the route is changed or not, based on line recognition information acquired through the image recognition module and the route change possible section information.

The road map information stored in the road map storage module may include line characteristic information, the information processing module may further include an information matching unit configured to calculate a traveling lane by matching the line recognition information to the line characteristic information, and when the image recognition module recognizes that a part of the vehicle is positioned over a route change line, the information matching unit may determine that a lane change for the route change is being performed.

The road map information stored in the road map storage module may include line characteristic information, the information processing module may further include an information matching unit configured to calculate a traveling lane by matching the line recognition information to the line characteristic information, and when the image recognition module recognizes that the entire vehicle departs from the route change line, the information matching unit may determine that a lane change for the route change was decided.

The road map information stored in the road map storage module may include line characteristic information, the information processing module may further include an information matching unit configured to calculate a traveling lane by matching the line recognition information to the line characteristic information, and when it is detected through an image recognized by the image recognition module that the vehicle enters a route change impossible section from a route change possible section, the information matching unit may determine that a lane change for the route change was completed.

A route change possible section included in the route change possible section information may be set when a traveling route is contacted with an existing route, a new route appears on the traveling route, or the traveling route is separated into two or more routes.

When the vehicle travels along a left line of a predetermined lane, an offset of the left line acquired through the image recognition module is constantly maintained, and an offset of a right line of the lane acquired through the image recognition module increases, the information processing module may determine that the vehicle will travel along a route connected to the left line.

When the vehicle travels along a left line of a predetermined lane, an offset of the left line acquired through the image recognition module is constantly maintained, and a right line disappears from an image acquired through the image recognition module, the information processing module may determine that the vehicle will travel along a route connected to the left line.

The route change determination system may further include a line change tracing unit configured to calculate a traveling lane by tracing a lane change record of the vehicle in a state where the traveling lane cannot be calculated by the information matching unit.

The information processing module may include a lateral position correction unit configured to calculate an offset for a left line of the current traveling lane from the image recognition information and correct a lateral position.

The lateral position correction unit adds the offset and the sum of widths of left lanes, included in the line characteristic information, in order to correct the lateral position.

The information processing module may further include a longitudinal position estimation unit configured to calculate a head angle between a line and a traveling direction of the vehicle from the image recognition information and estimate a longitudinal position, when a signal received through the GPS module is cut.

According to another embodiment of the present invention, a route change determination method using image recognition information includes: (a) calculating a traveling lane by matching line recognition information acquired through an image recognition module to line characteristic information of road map information; and (b) determining, by the image recognition module, that a lane change for route change is being performed, when the image recognition module recognizes that a part of the vehicle is positioned over a route change route.

The route change determination method may further include determining, by the image recognition module, that the lane change for route change was decided, when the image recognition module recognizes that the entire vehicle departs from the route change line.

The route change determination method may further include determining, by the image recognition module, that the route change was completed, when it is detected through an image acquired through the image recognition module that the vehicle enters a route change impossible section from a route change possible section.

The route change determination method may further include: when the traveling lane is not specified at the calculating of the traveling lane, correcting the traveling lane by tracing a lane change record of the vehicle; correcting a lateral position by calculating an offset for a left line of the current traveling lane from image recognition information of the image recognition module; and estimating a longitudinal position by calculating a head angle between a line and a traveling direction of the vehicle from the image recognition information, when a signal received by a GPS module is received.

The correcting of the lateral position may include correcting the lateral position by adding the offset and the sum of widths of left lanes included in the lane characteristic information.

Advantageous Effects

According to the embodiments of the present invention, a low-precision GPS device may be used to extract position information having high precision similar to that of a high-precision DGPS device, thereby determining a change of a traveling route. Furthermore, the change of the traveling route may be determined through line information, image recognition information, and section information connected to the GPS device.

Furthermore, the line recognition information and the section information extracted through the image recognition module and the stored or received line characteristic information may be matched to accurately calculate the traveling lane. Thus, position information acquired through a low-priced GPS device may be precisely corrected, and a change of the traveling lane may be determined to obtain high-precision position information without using a high-priced DGPS device.

BRIEF DESCRIPTION OF THE DRAWINGS

FIG. 4 is a line recognition information table according to the embodiment of the present invention.

FIGS. 5 to 8 illustrate examples in which a traveling lane is calculated according to the embodiment of the present invention.

BEST MODE FOR THE INVENTION

Figure 1:
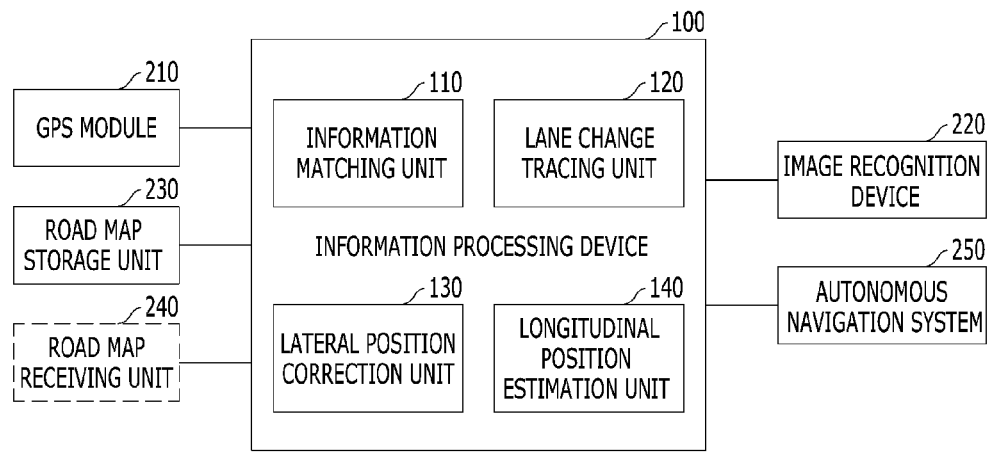
FIG. 1 is a block diagram of a GPS correction system according to an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Throughout the disclosure, like reference numerals refer to like parts throughout the various figures and embodiments of the present invention. The drawings attached to the disclosure are provided for convenience of description, and the shapes and relative scales thereof may be exaggerated or omitted.

When the exemplary embodiments are described in detail, duplicated descriptions or descriptions of techniques obvious to those skilled in the art will be omitted. Furthermore, when it is described that one element comprises (or includes or has) some elements, it should be understood that it may comprise (or include or has) only those elements, or it may comprise (or include or have) other elements as well as those elements if there is no specific limitation.

Furthermore, a term such as "~unit", "~er", or "~module" in the disclosure indicates a unit for processing one or more functions or operations, and may be implemented with hardware, software, or a combination of hardware and software. Furthermore, when one element is referred to as being electrically connected to another element, it should be understood that the former can be directly connected to the latter or electrically connected to the latter via an intervening element.

Terms such as 'line', 'lane', and 'route' used in the disclosure may be defined as follows.

'Line' indicates a solid or dotted line drawn in both sides of a lane where a vehicle travels, 'lane' indicates a way where a vehicle travels between two lines, and 'route' indicates a group of one or more lanes. On the route, a vehicle may move from one lane to another lane through a lane change. Although the vehicle travels along any one lane within the route, the vehicle may reach the same destination from a starting point.

FIG. 1 is a block diagram of a GPS correction system according to an embodiment of the present invention. Referring to FIG. 1, the GPS correction system using image recognition information according to the embodiment of the present invention includes a GPS module 210 mounted in a vehicle and an information processing module 100 configured to communicate with an image recognition module 220 and process information on a current traveling lane of a vehicle. According to another embodiment of the present invention, the GPS correction system may selectively include a road map storage module 230 configured to store road map information including line characteristic information and a road map receiving unit 240 configured to receive the road map information. According to another embodiment of the present invention, the road map storage module 230 and the road map receiving module 240 may be provided as one unit.

The road map storage module 230 may include any one storage medium of a flash memory type memory, a hard disk type memory, a multimedia card micro type memory, a card type memory (for example, SD or XD memory), RAM (Random Access Memory), SRAM (Static Random Access Memory), ROM (ReadOnly Memory), EEPROM (Electrically Erasable Programmable ReadOnly Memory), PROM (Programmable Read Only Memory), an optical memory, a magnetic disk, and an optical disk.

FIG. 1 illustrates that the information processing module 100 and the image recognition module 220 are separated from each other. However, the two devices do not need to be physically separated from each other. For example, the image recognition module 200 inside a navigation device may include the information processing module 100, or the image recognition device module 220 and the information processing module 110 may be provided inside the autonomous navigation system 250. The two modules may be configured as one processor, but may be separated from each other only in terms of software or may have different execution routines. That is, the information processing module 100, the image recognition device module 220 and the other components are divided only in terms of functionality, and may be implemented on the same hardware.

The GPS module 210 according to the embodiment of the present invention does not require high precision. The information processing module 100 according to the embodiment of the present invention corrects position information acquired through the GPS module 210 provided at a low price, using image recognition information, thereby converting the position information into information with high precision. The GPS module 210 may acquire position data through a global navigation satellite system (GNSS). The GNSS indicates a navigation system capable of calculating the position of a receiver terminal using a radio signal received from a satellite. Specific examples of the GNSS may include GPS (Global Positioning System), Galileo, GLONASS (Global Orbiting Navigational Satellite System), COMPASS, IRNSS (Indian Regional Navigational Satellite System), QZSS (Quasi-Zenith Satellite System) and the like, depending on operating agents thereof.

The information processing module 100 processes the traveling lane information and transmits high-precision position information to the autonomous navigation system 250. In the present embodiment, the communication between devices is performed through car area network (CAN). According to another embodiment of the present invention, the communication between devices may include near field communication such as Bluetooth, RFID (Radio Frequency Identification), infrared data association, UWB (Ultra WideBand), ZigBee or the like.

The information processing module 100 includes one or more processors. Referring to FIG. 1, the information processing module 100 includes an information matching unit 110, a lane change tracing unit 120, a lateral position correction unit 130, and a longitudinal position estimation unit 140. Each of the units may be configured as an independent processor inside the information processing module 100 or may constitute a programmed sub routine inside one processor. Furthermore, a part of the components may be selectively used.

Hereafter, the route change determination system and method using image recognition information according to the embodiment of the present invention will be described in detail by referring to embodiments of the respective units of the information processing module 100.

Figure 2A:
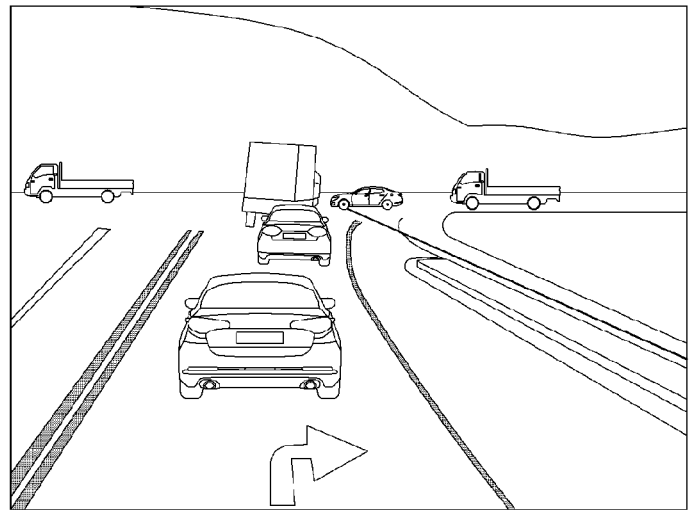
FIGS. 2A and 2B are photographs taken by an image recognition module.
Figures 2B, 3:
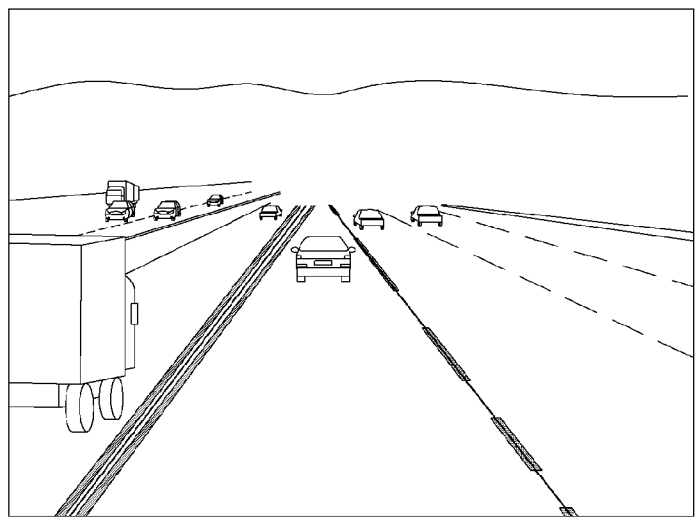
FIG. 3 is a line characteristic information table according to the embodiment of the present invention.

FIGS. 2A and 2B are photographs taken by a camera mounted on a vehicle while the vehicle travels. FIG. 2A is a photograph showing a first lane of a national highway, and FIG. 2B is a photograph of a second lane of an expressway. In FIG. 2A, a left line of the traveling lane of the vehicle is a yellow double solid line indicating a centerline, and a right line of the traveling lane is a white solid line. In FIG. 2B, a left line of the traveling lane of the vehicle is a blue double solid line indicating a bus-dedicated lane, and a right line of the traveling lane is a white dotted line. Such lines represent various pieces of information depending on the positions of lanes.

However, when a plurality of lines are drawn on a road, most of the lines are represented by white dotted lines. In some cases, the bus-dedicated lane may not be positioned in a left first lane, but positioned in a right first lane. Thus, the image recognition module 220 cannot accurately recognize a traveling lane only by analyzing an image taken through the camera.

According to the embodiment of the present invention, the information processing module 100 basically matches the line recognition information acquired through the image recognition module 220 to the road map information, and calculates a traveling lane. For example, the road map information is stored in the road map storage module 230. For another example, the road map receiving module 240 may communicate with an external device so as to receive the road map information.

According to the embodiment of the present invention, the road map information may include road map information provided from a safe driving assistance system, for example. According to another embodiment of the present invention, the road map information may include dedicated road map information provided for GPS correction. The road map information includes line characteristic information as illustrated in FIG. 3. The line characteristic information indicates information on a line corresponding to a current position measured by the GPS module 210. Referring to FIG. 3, the line characteristic information includes whether or not a line is a double line, the color information of the line, and the shape of the line (solid line or dotted line).

FIG. 3 is a line characteristic information table according to the embodiment of the present invention. In the line characteristic information table of FIG. 3, a line number '0' indicates a centerline, and is a yellow double solid line. A first line is a blue double solid line, and indicates a bus-dedicated lane. A first lane is formed between the centerline and the first line. Second to fourth lines are white dotted lines, and a fifth line is a white solid line.

When supposing that the image recognition module 220 recognizes only both lines of one lane, it is possible to acquire line recognition information as illustrated in FIG. 4. In FIG. 4, a line number '0' indicates a left line, and a line number '1' indicates a right line. In FIG. 4, the left line is a blue double solid line, and the right line is a white dotted line.

FIG. 5 illustrates that the information matching module 110 of the information processing module 100 matches line recognition information acquired through the image recognition module 220 to the line characteristic information. As illustrated in FIG. 5, line numbers 0 and 1 of the line recognition information are exactly or uniquely matched to the line numbers 1 and 2 of the line characteristic information. Thus, the information matching unit 110 may determine that the current traveling lane is a second lane. The GPS module 210 with low precision cannot accurately recognize a traveling lane. However, through the information matching operation, it is possible to accurately calculate the current traveling lane of the vehicle.

FIG. 6 illustrates that the information processing module 100 may calculate a traveling lane even when the line recognition information and the line characteristic information partially match with each other. For example, depending on the lane information recognized by the image recognition module 220, a double line may be recognized as a single line. In this case, a left line may be recognized as a blue single solid line, and a right line may be recognized as a white dotted line.

The information matching unit 110 performs information matching as illustrated in FIG. 6. The left line is partially matched to the first line of the line characteristic information, but the right line is exactly matched to the second line of the line characteristic information. At this time, it can be seen that the left and right lines of the line recognition information are not matched to the other lines. That is, the line recognition information is uniquely matched to the line characteristic information, when the left line is the first line and the right line is the second line. In this case, the information matching unit 110 may determine that the current traveling lane is the second lane.

FIG. 7 illustrates another example in which line recognition information and line characteristic information partially match with each other. As illustrated in FIG. 7, the line recognition information may include information on four lines. For example, the image recognition module 220 not only may recognize both lines of a current traveling lane, but also may recognize other lines around the traveling lane. Furthermore, as illustrated in FIG. 6, a state in which a double line is not accurately recognized may occur.

The information matching unit 110 performs information matching as illustrated in FIG. 7. As illustrated in FIG. 7, partial matches and exact matches occur at the same time. However, the information on four lines in the line recognition information is uniquely matched to the line characteristic information from the centerline to the third line. Even in this case, the information matching unit 110 may accurately calculate the current traveling lane by matching the line recognition information to the line characteristic information.

As illustrated in FIG. 8, however, line recognition information may exactly match with the line characteristic information, but may not uniquely match with the line characteristic information. For example, both of left and right lines of the line recognition information may correspond to white dotted lines. In this case, the line recognition information exactly matches with information on the second and third lines or third and fourth lines of the line characteristic information. Thus, the position of the traveling lane cannot be accurately calculated only through the information matching unit 110.

The lane change tracing unit 120 of FIG. 1 traces the latest information matching result. For example, when the latest information matching result corresponds to a state in which the traveling lane is determined to be the second lane, the lane change tracing unit 120 checks a lane change record. Since the lane change record may be checked by the image recognition module 220, the lane change tracing unit 120 may trace the traveling lane by substituting a lane change time.

For example, suppose that a lane change was recorded one time and the traveling lane was determined to be the second lane according to the latest information matching result in a state where the information matching result as illustrated in FIG. 8 was obtained. In this case, the current traveling lane of the vehicle may be determined to be the third lane. For another example, when the traveling lane is changed to a right lane in a state where the traveling lane was determined to be the second lane according to the latest information matching result, the traveling lane may be traced and calculated by adding one to the number of traveling lane, and when the traveling lane is changed to a left lane, the traveling lane may be traced and calculated by subtracting one from the number of the traveling lane, until the next traveling lane is determined.

As described above, when the GPS information is corrected through the information matching unit 110 and the lane change tracing unit 120, the current position of the vehicle may be estimated within the traveling lane. Since typical roads have a width of about 3 m, precise position estimation with a small error may be realized.

Furthermore, the route change determination system and method according to the embodiment of the present invention may calculate more precise position information using the lateral position correction unit 130 and the longitudinal position correction unit 140 of FIG. 1.

Figures 9, 10:
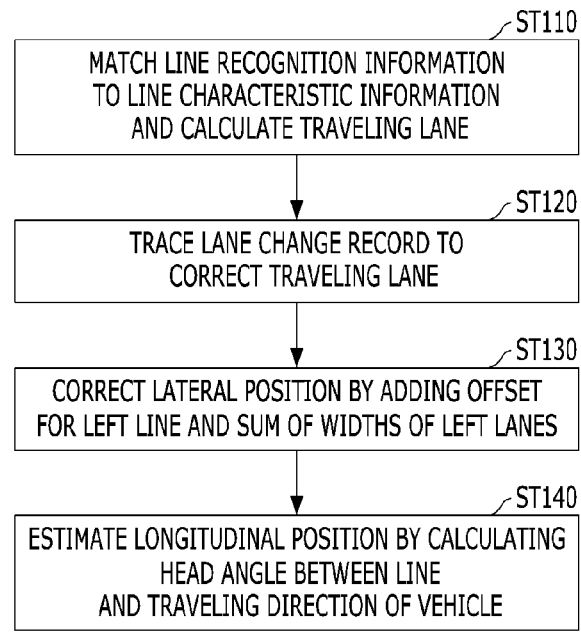
FIG. 9 is a flowchart illustrating GPS correction according to the embodiment of the present invention.
FIG. 10 is a lane width information table according to the embodiment of the present invention.

FIG. 9 is a flowchart illustrating GPS correction according to the embodiment of the present invention. Referring to FIG. 9, the information processing module 100 matches line recognition information acquired through the image recognition module 220 to line characteristic information of road map information and calculates a traveling lane at step ST110. A variety of examples in which the information matching unit 110 calculates a traveling lane have been already described above.

When the traveling lane is not specified at step ST110, the lane change tracing unit 120 traces a lane change record of the vehicle and corrects the traveling lane at step ST120.

In order to obtain more precise position information, an offset for a left line of the traveling lane is calculated to correct a lateral position at step S130. As illustrated in FIG. 10, the line characteristic information includes width information of each lane. When the traveling lane is determined to be a second lane at the step ST110 or ST120, a width from the centerline to the left line of the traveling lane may be calculated from the sum of widths of the first and second lanes. In FIG. 10, the sum of widths to the left line corresponds to 6 m.

A distance between the left line and the vehicle may be acquired from the image recognition module 220. Typically, a specific point on a road is projected into one point of an image through a camera conversion formula. The camera conversion formula is set through a coordinate conversion model of a camera, a correction model, a focal distance of a lens, an installation height of the camera, and an installation angle of the camera. When the camera conversion formula is used at a line recognized at an image, an offset between the line and the vehicle may be calculated.

Equations 1 and 2 show an example of a simplified camera conversion formula.

$$x = -\lambda \frac{X}{Z\cos\Phi + h\sin\Phi}\left(-\lambda \frac{X}{Z + h\Phi}\right) \quad \text{[Equation 1]}$$

$$y = -\lambda \frac{Z\cos\Phi - h\sin\Phi}{Z\cos\Phi + h\sin\Phi}\left(-\lambda \frac{Z\Phi - h}{Z + h\Phi}\right) \quad \text{[Equation 2]}$$

Here, x and y represent coordinate values on a screen, X and Z represent coordinate values on a road, $\lambda$ represents a focal distance of a lens, $\Phi$ represents a camera installation angle, and h represents a camera installation height.

Figure 11:
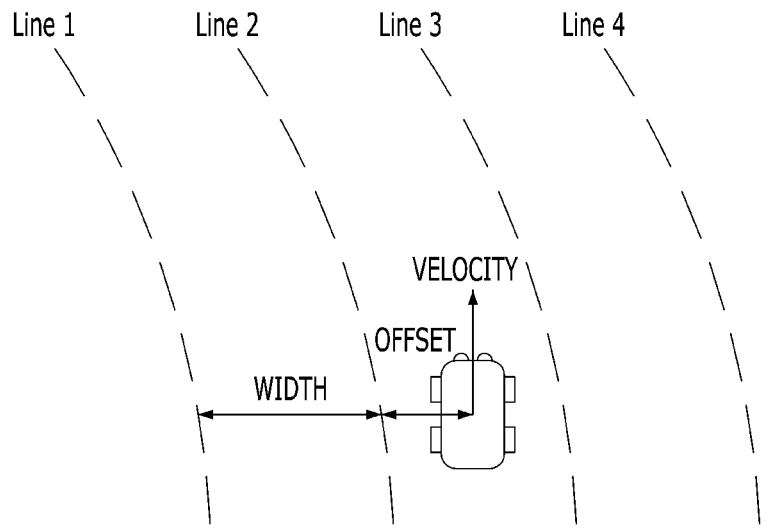
FIG. 11 is a diagram illustrating an example in which a lateral position is corrected according to the embodiment of the present invention.
Figure 12:
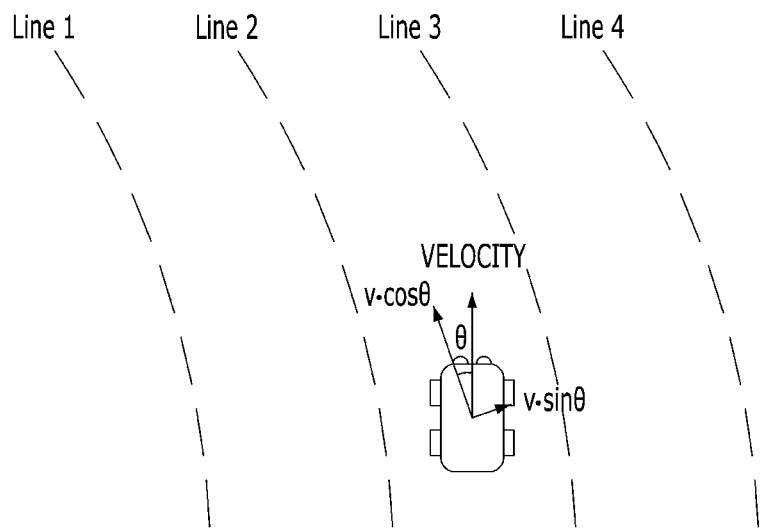
FIG. 12 is a diagram illustrating an example in which a longitudinal position is corrected according to the embodiment of the present invention.

Referring to FIG. 11, the lateral position correction unit 130 adds the sum of widths of the left lane of the current traveling lane and the offset obtained through the above equations and corrects the lateral position, thereby obtaining a high-precision lateral position having an error much smaller than simple traveling lane information. As the offset of the traveling lane is used to correct the lateral position, the error decreases to several tens of cm.

Referring to FIG. 9, a head angle formed between the line and the traveling direction of the vehicle is calculated to estimate a longitudinal position at step ST140. The longitudinal position refers to a displacement on the road map in the line direction. In autonomous navigation or navigation guide, autonomous navigation control or geographic guide is conducted according to the longitudinal position. The longitudinal position needs to be estimated in a place such as a tunnel, where the reception of the GPS module 110 is cut.

Conventionally, a longitudinal position has been estimated under the supposition that a vehicle constantly maintains the velocity at a moment when GPS reception is cut. In this method, however, when the vehicle is caught in a traffic congestion inside a tunnel, an error occurs in the position estimation. According to another method, an inertia sensor, an acceleration sensor, a gyro-sensor or the like may be used to correct a displacement. In this case, since the measured displacement is an absolute displacement, it is difficult to measure the relation with a line on the road map.

In the present embodiment, image recognition information is used to estimate a longitudinal position. The longitudinal position estimation unit 140 calculates a head angle between the line and the traveling direction of the vehicle through image recognition of a previous page at a moment when GPS reception is cut. Then, the longitudinal position estimation unit 140 acquires vehicle velocity information from an ECU or velocity sensor of the vehicle. A traveling distance in the line direction during a measurement period may be obtained through the following equation. At this time, the movement direction coincides with a normal direction of the line on the road map. Thus, the movement direction in a curved place changes at each moment.

$$LP = \Delta t \times v \times \cos\theta \quad \text{[Equation 3]}$$

Here, LP represents a longitudinal position of the vehicle, $\Delta t$ represents a time variation, v represents the velocity of the vehicle, and $\theta$ represents the head angle between the line and the traveling direction of the vehicle.

When the values of Equation 3 are accumulated during a predetermined time (for example, a time from a moment when GPS reception is cut to a moment when the GPS reception is recovered), the distance which the vehicle has traveled in the line direction may be calculated. Then, the longitudinal position of the vehicle may be estimated.

Figure 13:
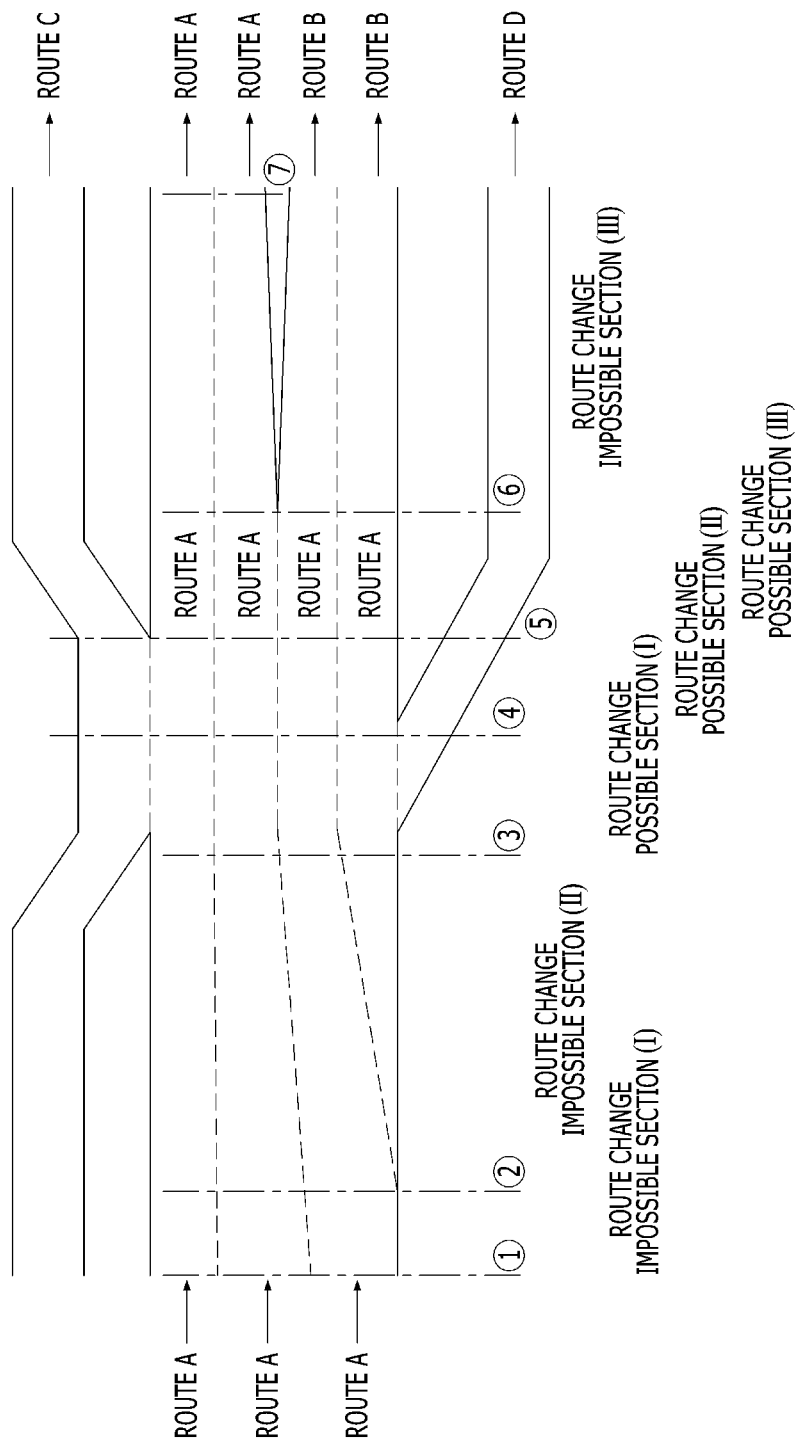
FIG. 13 is a diagram for explaining a route change at each section on a road according to the embodiment of the present invention.

FIG. 13 is a diagram for explaining a route change at each section on a road according to the embodiment of the present invention.

The route according to the embodiment of the present invention is divided into 'route change impossible section' and 'route change possible section', and stored in the road map storage module 230. The route change impossible section refers to a section in which a vehicle cannot move from a route where the vehicle is traveling to another route, until the vehicle departs from the section. The route change possible section refers to a section in which a vehicle can move from a route where the vehicle is traveling to another route through a lane change, before the vehicle departs from the section. When a route change is not conducted within a predetermined section, the section does not correspond to the route change possible section.

The route change possible section may be connected to any one of a route change impossible section and another route change possible section, before and after the route change possible section. Furthermore, route change possible sections may be successively connected. After a vehicle passes through a route change possible section, one or more routes may be designated as the same name as a route before the vehicle passes through the route change possible section.

Furthermore, a new lane may appear or disappear within a route. For example, in a route change impossible section II, although a new lane is connected to a lane which may be changed to another route afterwards, the new lane does not need to be considered before the route change is clearly decided. In this case, the section may be subdivided, and the addition of lane may be reflected into the line information when the vehicle moves from a previous section to a next section.

Referring to FIG. 13, the route change possible section according to the embodiment of the present invention may be set in the following cases:

- a route where a vehicle is traveling is contacted with another existing route (route C),
- a new route appears in the route where the vehicle is traveling (route D), and
- the route where the vehicle is traveling is separated (route B).

A route joining the route change possible section does not need to be considered, because a route change to the route is impossible as long as the vehicle does not go in the reverse direction.

Furthermore, the route change in FIG. 13 may be divided into the following cases:

- the vehicle changes a route from a left end lane of a route A within a route change possible section to a left lane (route A→route C),
- the vehicle changes a route from a right end lane of the route A within the route change possible route to a right lane (route A→route D),
- the vehicle changes a route from one lane to another lane of the route A within the route change possible section (route A of second lane→route B of first lane), and the vehicle goes straight to change a route without changing from one lane to another lane of the route A of the route change possible section.

Furthermore, the route maintenance may be divided into the following cases:

the vehicle travels without changing from one lane to another lane of the route A within the route change possible route (route A of second lane→route A of second lane), and the vehicle travels while changing from one lane to another lane of the route A within the route change possible route (route A of third lane→route A of second lane).

In the second case of the route maintenance, the lane change may be performed a plurality of times.

FIGS. 14A to 14F are diagrams illustrating route change determination for the respective sections of FIG. 13 according to the embodiment of the present invention, showing results obtained by modeling the sections.

In FIGS. 14A to 14F, an arrow represents a traveling direction of a vehicle, a left box represents a lane at the time at which the vehicle enters a section, an arrow facing a box represents a route at the time at which the vehicle enters a section, a right box represents a lane at the time at which the vehicle exits from a section, and an arrow coming out of a box represents a route at the time at which the vehicle exist from a section. When a box representing a lane is located only in the left side, the box represents a disappearing lane, and when a box representing a lane is located only in the right side, the box represents an appearing lane.

A lane at an exit time, corresponding to a lane at an entry time, indicates a lane connected when the vehicle travels without a lane change, even though the lane disappears or appears in the middle of a section. When a lane at an entry time does not correspond to a lane at an exit time, it indicates that the vehicle can move to the lane through a lane change.

In FIGS. 14A to 14F, L represents a lane adjacent to the left side of a route, and R represents a lane adjacent to the right side of a route. When a plurality of lanes exist, the lanes may be represented L1, L2, . . . or R1, R2, . . . .

Figure 14A:
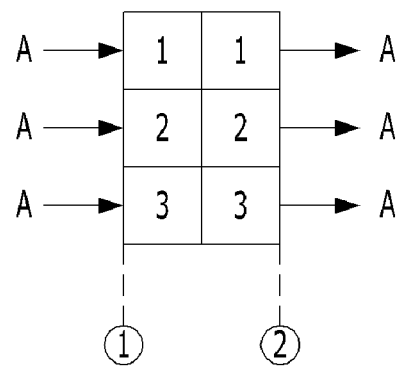
FIGS. 14A to 14F are diagrams illustrating route change determination for sections of FIG. 13 according to the embodiment of the present invention.
Figure 14B:
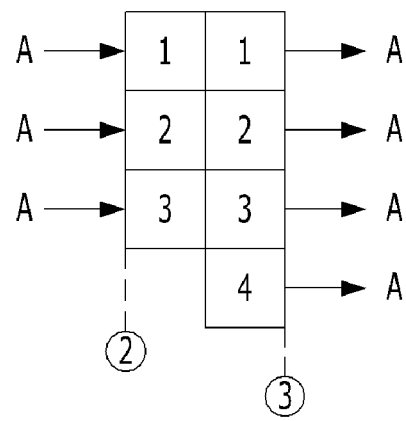
Figure 14C:
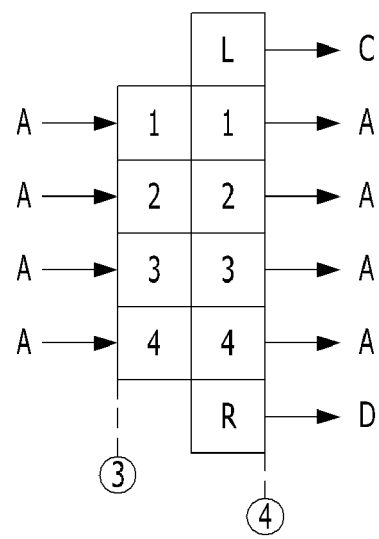
Figure 14D:
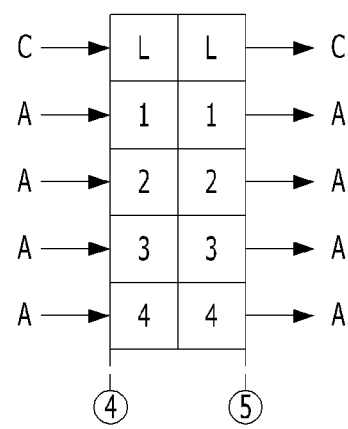
Figure 14E:
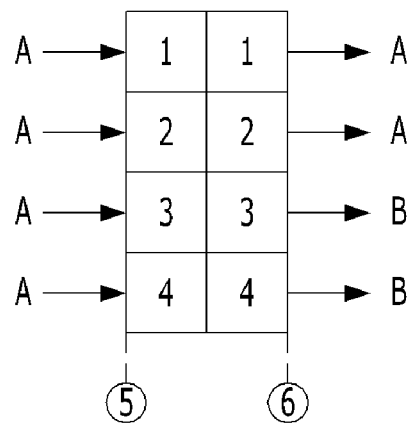
Figure 14F:
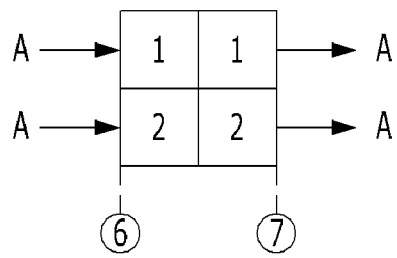

FIG. 14A illustrates a route change impossible section I in which the vehicle cannot change a route because the number of lanes at an entry time is equal to the number of lanes at an exit time. FIG. 14B illustrates a route change impossible section II in which the vehicle cannot still change a route even though the number of lanes at an entry time is larger than the number of lanes at an exit time because one lane appears. FIG. 14C illustrates a route change possible section I in which the vehicle can change a route to a left route C or a right route D. FIG. 14D illustrates a route change possible section II in which the vehicle can change a lane to the left route C. FIG. 14E illustrates a route change possible section III in which the vehicle can change a route because the route A is divided into the routes A and B. FIG. 14F illustrates a route change impossible section III in which the vehicle cannot change a route because the number of lanes at an entry time is equal to the number of lanes at an exit time.

Figure 15:
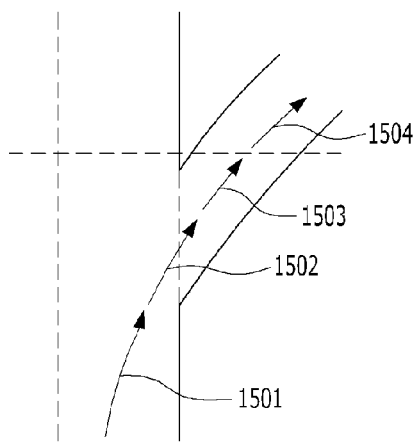
FIG. 15 is a diagram illustrating a route change state according to the embodiment of the present invention.

FIG. 15 is a diagram illustrating a route change state according to the embodiment of the present invention. Depending on the current position of a vehicle, it is possible to determine route change intention, route change, route change decision, and route change completion.

That is, the information matching unit 110 within the information processing module 100 according to the embodiment of the present invention determines that there is a route change intention when an offset of a route change line acquired through the image recognition module 220 decreases by a predetermined ratio or more, at 1501. When the image recognition module 220 recognizes that a part of the vehicle is positioned over the route change line, the information matching unit 110 determines that a lane change for route change is being performed, at 1502. When the image recognition module 220 recognizes that the entire vehicle departs from the route change line, the information matching unit 110 determines that the lane change for route change was decided, at 1503. When it is detected through an image recognized by the image recognition module 220 that the vehicles enters a route change impossible section from a route change possible section, the information matching unit 110 determines that the route change is completed, at 1504. The route change line indicates a line for entering another route from a current traveling route. For example, the route change line may include a leftmost or rightmost line or a line for dividing a traveling route.

Referring to FIG. 14C, when it is recognized that a part of the vehicle is positioned over a left route change line, the information matching unit 110 determines that the route is being changed to the route C. The left route change line indicates a line between a lane L and a lane 1. When it is recognized that a part of the vehicle is positioned over a right route change line, the information matching unit 110 determines that the route is being changed to the route D. The right route change line indicates a line between a lane 4 and a lane R.

According to another embodiment of the present invention, the information matching unit 110 of the information processing module 100 determines that a lane change for route change was decided, even when the vehicle does not perform a lane change for route change such that a route at an exit time is predicted.

Figure 16:
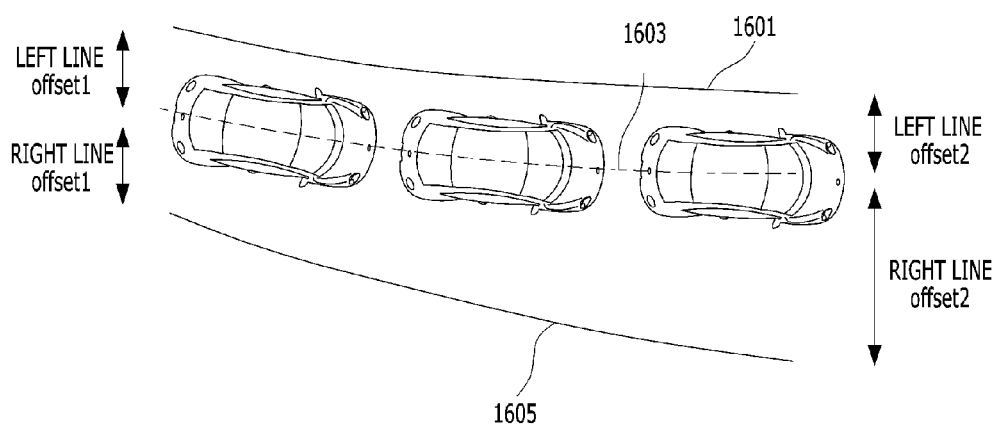
FIG. 16 is a diagram illustrating a method for determining a lane change and a route decision according to another embodiment of the present invention.

FIG. 16 is a diagram illustrating a method for determining a lane change and a route decision according to another embodiment of the present invention. The method may be used when a line is partially erased or obscure so as not to be recognized, or when the corresponding line is a line for determining a route change.

Referring to FIG. 16, when a vehicle travels along a left line 1601, an offset of the left line 1601 acquired through the image recognition module 220 is constantly maintained (left line offset 1=left line offset 2), and an offset of a right line 1605 acquired through the image recognition module 220 increases (right line offset 1<right line offset 2), the information matching unit 110 within the information processing module 100 determines that the vehicle will travel along a route connected to the left line.

Even when the vehicle travels along the left line 1601, the offset of the left line acquired through the image recognition module 220 is constantly maintained (left line offset 1=left line offset 2), and the right line disappears from an image acquired through the image recognition module 220, the information matching unit 110 within the information processing module 100 determines that the vehicle will travel along the route connected to the left line.

On the other hand, when the vehicle travels along the right line 1605, the offset of the right line 1605 acquired through the image recognition module 220 is constantly maintained (right line offset 1=right line offset 2), and the offset of the left line 1601 acquired through the image recognition module 220 increases (left line offset 1<left line offset 2), the information matching unit 110 within the information processing module 100 determines that the vehicle will travel along a route connected to the right line 1605.

Similarly, even when the vehicle travels along the right line 1605, the offset of the right line 1605 acquired through the image recognition module 220 is constantly maintained (right line offset 1=right line offset 2), and the left line 1601 disappears from the image acquired through the image recognition module 220, the information matching unit 110 within the information processing module 100 determines that the vehicle will travel along the route connected to the right line 1605.

The left line offset and the right line offset indicate distances from a central virtual reference line 1603 to the left line 1601 and the right line 1605, respectively.

The route change determination system and method using image recognition information according to the embodiment of the present invention may match line recognition information to line characteristic information and trace a line change to specify a traveling lane. Furthermore, the route change determination system and method may calculate an offset for a left line of the traveling lane from image recognition information so as to correct a lateral position, and calculate a head angle from the image recognition information so as to estimate a longitudinal position, thereby more precisely specifying the lateral position and the longitudinal position. Thus, the route change determination system and method may determine a change of a traveling route, and accurately determine the change of the traveling route using line information connected to the GPS device, image recognition information, and section information.

While the present invention has been described with respect to the specific embodiments, it will be apparent to those skilled in the art that various changes and modifications may be made without departing from the spirit and scope of the invention as defined in the following claims.

The invention claimed is:

1. A route change determination system using image recognition system, comprising:
   a GPS module;
   an image recognition module having a line recognition function;
   a road map storage module configured to store road map information and route change possible section information for changing a route of a vehicle;
   a road map receiving module configured to receive the road map information; and
   an information processing module configured to determine whether the route is changed or not, based on line recognition information acquired through the image recognition module and the route change possible section information,
   wherein the road map information stored in the road map storage module comprises line characteristic information,
   the information processing module further comprises an information matching unit configured to calculate a traveling lane by matching the line recognition information to the line characteristic information, and
   when the image recognition module recognizes that a part of the vehicle is positioned over a route change line, the information matching unit determines that a lane change for the route change is being performed.

2. The route change determination system of claim 1, wherein
   when the image recognition module recognizes that the entire vehicle departs from the route change line, the information matching unit determines that the lane change for the route change was decided.

3. The route change determination system of claim 1, wherein
   when it is detected through an image recognized by the image recognition module that the vehicle enters a route change impossible section from a route change possible section, the information matching unit determines that the lane change for the route change was completed.

4. The route change determination system of claim 1, wherein a route change possible section included in the route change possible section information is set when a traveling route is contacted with an existing route, a new route appears on the traveling route, or the traveling route is separated into two or more routes.

5. The route change determination system of claim 1, wherein when the vehicle travels along a left line of a predetermined lane, an offset of the left line acquired through the image recognition module is constantly maintained, and an offset of a right line of the lane acquired through the image recognition module increases, the information processing module determines that the vehicle will travel along a route connected to the left line.

6. The route change determination system of claim 1, wherein when the vehicle travels along a left line of a predetermined lane, an offset of the left line acquired through the image recognition module is constantly maintained, and a right line disappears from an image acquired through the image recognition module, the information processing module determines that the vehicle will travel along a route connected to the left line.

7. The route change determination system of claim 1, wherein when the vehicle travels along a right line of a predetermined lane, an offset of the right line acquired through the image recognition module is constantly maintained, and an offset of a left line of the lane acquired through the image recognition module increases, the information processing module determines that the vehicle will travel along a route connected to the right line.

8. The route change determination system of claim 1, wherein when the vehicle travels along a right line of a predetermined lane, an offset of the right line acquired through the image recognition module is constantly maintained, and a left line disappears from an image acquired through the image recognition module, the information processing module determines that the vehicle will travel along a route connected to the right line.

9. The route change determination system of claim 1, further comprising a line change tracing unit configured to calculate the traveling lane by tracing a lane change record of the vehicle in a state where the traveling lane cannot be calculated by the information matching unit.

10. The route change determination system of claim 9, wherein the information processing module further comprises a lateral position correction unit configured to calculate an offset for a left line of the current traveling lane from the image recognition information and correct a lateral position.

11. The route change determination system of claim 10, wherein the lateral position correction unit adds the offset and the sum of widths of left lanes, included in the line characteristic information, in order to correct the lateral position.

12. The route change determination system of claim 10, wherein the information processing module further comprises a longitudinal position estimation unit configured to calculate a head angle between a line and a traveling direction of the vehicle from the image recognition information and estimate a longitudinal position, when a signal received through the GPS module is cut.

13. The route change determination system of claim 12, wherein the longitudinal position estimation unit estimates the longitudinal position through the following equation:

$$LP = \Delta t \times v \times \cos\theta$$

where LP represents the longitudinal position of the vehicle, $\Delta t$ represents a time variation, v represents velocity of the vehicle, and $\theta$ represents the head angle between the line and the traveling direction of the vehicle.

14. A route change determination method using image recognition information, comprising:
(a) calculating a traveling lane by matching line recognition information acquired through an image recognition module to line characteristic information of road map information; and
(b) determining, by the image recognition module, that a lane change for route change is being performed, when the image recognition module recognizes that a part of the vehicle is positioned over a route change route.

15. The route change determination method of claim 14, further comprising determining, by the image recognition module, that the lane change for route change was decided, when the image recognition module recognizes that the entire vehicle departs from the route change line.

16. The route change determination method of claim 14, further comprising determining, by the image recognition module, that the route change was completed, when it is detected through an image acquired through the image recognition module that the vehicle enters a route change impossible section from a route change possible section.

17. The route change determination method of claim 14, further comprising:
when the traveling lane is not specified at the calculating of the traveling lane, correcting the traveling lane by tracing a lane change record of the vehicle;
correcting a lateral position by calculating an offset for a left line of the current traveling lane from image recognition information of the image recognition module; and
estimating a longitudinal position by calculating a head angle between a line and a traveling direction of the vehicle from the image recognition information, when a signal received by a GPS module is received.

18. The route change determination method of claim 17, wherein the correcting of the lateral position comprises correcting the lateral position by adding the offset and the sum of widths of left lanes included in the lane characteristic information.

19. The route change determination method of claim 18, wherein the estimating of the longitudinal position is based on the following equation:

$$LP = \Delta t \times v \times \cos\theta$$

where LP represents a longitudinal position of the vehicle, $\Delta t$ represents a time variation, v represents velocity of the vehicle, and $\theta$ represents the head angle between the line and the traveling direction of the vehicle.

* * * * *